(12) United States Patent
Baumgart et al.

(10) Patent No.: US 7,008,673 B2
(45) Date of Patent: Mar. 7, 2006

(54) HARDENABLE MIXTURE OF SUBSTANCES, PRODUCTION METHOD AND USE THEREOF

(75) Inventors: Hubert Baumgart, Münster (DE); Sandra Hasse, Drensteinfurt (DE); Helmut Kleine Beckmann, Ostbevern (DE); Vincent Cook, Münster (DE)

(73) Assignee: BASF Coatings AG, Munster (DE)

( * ) Notice: Subject to any disclaimer, the term of this patent is extended or adjusted under 35 U.S.C. 154(b) by 97 days.

(21) Appl. No.: 10/490,344

(22) PCT Filed: Oct. 16, 2002

(86) PCT No.: PCT/EP02/11585

§ 371 (c)(1),
(2), (4) Date: Mar. 22, 2004

(87) PCT Pub. No.: WO03/037952

PCT Pub. Date: May 8, 2003

(65) Prior Publication Data
US 2004/0266905 A1 Dec. 30, 2004

(30) Foreign Application Priority Data
Oct. 31, 2001 (DE) ............................. 101 53 645

(51) Int. Cl.
C09D 133/14 (2006.01)
C09D 161/20 (2006.01)
(52) U.S. Cl. ................ 427/407.1; 427/409; 428/423.1; 428/425.6; 428/425.8; 524/507; 524/512; 525/124; 525/131; 525/509
(58) Field of Classification Search ............ 427/407.1, 427/409; 428/423.1, 425.6, 425.8; 524/507, 524/512; 525/124, 131, 509
See application file for complete search history.

(56) References Cited

U.S. PATENT DOCUMENTS

| | | | |
|---|---|---|---|
| 4,002,601 A | 1/1977 | Hajek et al. | |
| 4,522,913 A | 6/1985 | Kanno et al. | |
| 5,412,056 A | 5/1995 | Zwiener et al. | |
| 5,716,678 A | 2/1998 | Rockrath et al. | |
| 5,744,569 A | 4/1998 | Bruchmann et al. | |
| 5,945,499 A * | 8/1999 | Ohrbom et al. | 528/75 |
| 6,261,645 B1 | 7/2001 | Betz et al. | |
| 6,410,646 B1 | 6/2002 | Rockrath et al. | |
| 2003/0104132 A1 | 6/2003 | Baumgart et al. | |
| 2003/0166815 A1 | 9/2003 | Baumgart et al. | |

FOREIGN PATENT DOCUMENTS

| | | |
|---|---|---|
| CA | 2310715 | 11/1998 |
| CA | 2258813 | 1/1999 |
| DE | 19609617 | 9/1997 |
| DE | 19850210 | 5/2000 |
| DE | 19850243 | 5/2000 |
| DE | 10020969 | 11/2001 |
| DE | 10023229 | 11/2001 |
| DE | 10047989 | 4/2002 |
| DE | 10118532 | 10/2002 |
| DE | 10140145 | 3/2003 |
| EP | 594142 | 4/1994 |
| EP | 710707 | 11/1994 |
| EP | 915113 | 5/1999 |

OTHER PUBLICATIONS

Abstract for DE10020969 from EPO, Nov. 8, 2001.
Abstract for DE10023229 from EPO, Nov. 22, 2001.
Abstract for DE10118532 from EPO, Oct. 24, 2002.
Abstract for JP09235462, from EPO, Sep. 9, 1997.
U.S. Appl. No. 09/830,694, filed Apr. 27, 2001, Rink et al.
U.S. Appl. No. 10/380,916, filed Mar. 18, 2003, Baumgart et al.
U.S. Appl. No. 10/483,701, filed Jan. 13, 2004, Baumgart et al.
U.S. Appl. No. 09/830,440, filed May 15, 2001, Baumgart et al.

* cited by examiner

Primary Examiner—David J. Buttner

(57) ABSTRACT

A curable composition comprising
(A) constituents containing carbamate groups I:

$$-O-C(O)-NHR \qquad (I)$$

in which R=a hydrogen atom or an alkyl, cycloalkyl or aryl group,
(B) constituents containing carbamate-reactive groups, the equivalents ratio of carbamate-reactive groups in (B) to carbamate groups in (A) being >0.2,
(C) adducts preparable from
(c1) polyisocyanates and
(c2) compounds II containing isocyanate-reactive functional groups:

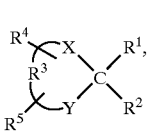

(II)

in which
$R^1$ and $R^2$: independently of one another are hydrogen atoms or alkyl radicals;
X and Y: oxygen atom, sulfur atom or a radical $>N-R^6$, in which $R^6$=aliphatic radical;
$R^3$: is an alkylene radical;
$R^4$ and $R^5$: are hydrogen atoms, isocyanate-reactive functional groups or $R^6$;
with the proviso that one group $R^4$, $R^5$ or $R^6$ contains an isocyanate-reactive functional group or $R^4$ or $R^5$ is an isocyanate-reactive functional group and the other radicals $R^4$, $R^5$ or $R^6$—where present—contain no isocyanate-reactive groups;
the molar ratio of (c1) to (c2) being chosen such that the adducts (C) contain in the molecule isocyanate groups; process for its preparation, and its use.

14 Claims, No Drawings

HARDENABLE MIXTURE OF SUBSTANCES, PRODUCTION METHOD AND USE THEREOF

CROSS REFERENCE TO RELATED APPLICATIONS

This application is a National Phase Application of Patent Application PCT/EP02/11585 filed on 16 Oct. 2002, which claims priority to DE 101 53 645.3, filed on 31 Oct. 2001.

The present invention relates to a novel curable composition. The present invention also relates to a novel process for preparing curable compositions. The present invention additionally relates to the use of the novel curable compositions for producing moldings and films and also as coating materials, adhesives, and sealing compounds for producing coatings, adhesive films, and seals.

Two-component coating materials comprising reactive components containing isocyanate-reactive functional groups, customary and known polyisocyanates, and adducts of diisocyanates and dioxolanes, dioxanes or oxazolidines containing an isocyanate-reactive functional group, in a molar ratio of 1:1, are known from the German patent application DE 196 09 617 A1.

According to page 3 line 68 to page 4 line 10, said reactive components comprise, inter alia, hydroxy-functional polymers having a hydroxyl content of from 0.1 to 20% by weight (corresponding to from 33 to 660 mg KOH/g). The number-average molecular weight of these polymers is preferably from 1000 to 100,000. The polymers contain preferably more than 50% by weight of $C_1$–$C_{20}$ alkyl (meth)acrylate, vinylaromatics having up to 20 carbon atoms, vinyl esters of carboxylic acids containing up to 20 carbon atoms, vinyl halides, nonaromatic hydrocarbons having from 4 to 8 carbon atoms and one or two double bonds, unsaturated nitrites, and mixtures thereof. Preferred polymers are those containing up to 60% by weight of $C_1$–$C_{10}$ alkyl (meth)acrylates, styrene or mixtures thereof. Additionally, the polymers contain in copolymerized form hydroxy-functional monomers, corresponding to the above hydroxyl content, and also further monomers, such as unspecified unsaturated acids, especially carboxylic acids, acid anhydrides or acid amides. According to page 9 lines 30 to 45, "Preparation and testing of clearcoat materials with the compounds A—two-component system", the hydroxy-functional vinyl polymer Lumitol® H 136 from BASF Aktiengesellschaft is used as the reactive component, this being an acrylate copolymer of hydroxypropyl acrylate, styrene, isobutyl acrylate, and acrylic acid with an OH number of 136 mg KOH/g.

The reactive components, accordingly, do not contain carbamate groups.

The known clearcoat materials have a high solids content of up to 76% by weight. The clearcoats produced from them have good mechanical properties, particularly a high hardness and flexibility, and also high chemical resistance.

The two-component coating materials known from the German patent application DE 196 09 617 A1 are not, however, so broadly applicable as would actually be desirable. Moreover, their pot life, i.e., the time within which they can be processed without problems after the two components have been mixed, and give flawless coatings, is still in need of lengthening.

The German patent applications DE 198 50 243 A1 or DE 198 50 210 A1 disclose curable compositions comprising binders that are free from carbamate groups. Where they are one-component systems, the compositions comprise crosslinking agents which may, inter alia, be amino resins. Where they are multicomponent systems, it is also possible to use the isocyanato-containing adducts known from the German patent application DE 196 09 617 A1. The conjoint use of amino resins and the known isocyanato-containing adducts is neither recommended nor documented by an example. As multicomponent systems, the compositions known from the German patent application DE 198 50 243 A1, owing to their high hydroxyl-containing reactive diluent content, have a comparatively high reactivity and, as a result, a comparatively short pot life or processing time.

European patent application EP 0 915 113 A1 discloses a curable coating material comprising
(1a) a compound containing hydroxyl and carbamate groups,
(1b) a polyisocyanate crosslinking agent, and
(1c) an amino resin crosslinking agent.

Alternatively, the curable coating material comprises
(2a) a compound containing carbamate groups,
(2b) a compound containing hydroxyl groups,
(2c) a polyisocyanate crosslinking agent, and
(2d) an amino resin crosslinking agent.

In these materials it is essential that
the effective equivalents of the amino resin crosslinking agent are less than or equal to the equivalents of the carbamate groups, and
the effective equivalents of the polyisocyanate crosslinking agent are less than or equal to the equivalents of the hydroxyl groups.

Preferably, the ratio of the effective equivalents of the amino resin crosslinking agent to the effective equivalents of the carbamate groups is at least 0.6, more preferably at least 0.8.

The effect of this combination is that the viscosity in the initial phase of crosslinking does not fall to such an extent that excessive flow of the coating material is accompanied by the development of surface defects, such as runs, depressions, "fat edges" or orange peel.

This effect derives from the fact that the amino resin crosslinking agent reacts first with the carbamate groups before the blocked isocyanate groups of the polyisocyanate crosslinking agent react with the hydroxyl groups. The equivalents ratio has the consequence, moreover, that the amino resin crosslinking agent does not react with the hydroxyl groups and so form unwanted ether groups which offer sites for attack by aggressive chemicals, such as acid rain, or actinic radiation, such as UV radiation.

Where polyisocyanate crosslinking agents containing free isocyanate groups are used, they react with the hydroxyl groups before the amino resin crosslinking agent reacts with the carbamate groups, so producing the same effect. Isocyanato-containing adducts such as are known from the German patent application DE 196 09 617 A1 are not used as polyisocyanate crosslinking agents.

The known coating material requires further improvement in its solids content, and it is also necessary to increase further the crosslinking density of the coatings produced from it.

The European patent application EP 0 710 707 A2 discloses a coating material which comprises a binder free of carbamate groups, a crosslinking agent, such as an amino resin or polyisocyanate, and a low molecular mass, oligomeric or polymeric constituent, particularly a low molecular mass constituent, that contains carbamate groups. The conjoint use of amino resins and polyisocyanates is not recommended in the European patent application. Moreover, isocyanato-containing adducts such as are known from the German patent application DE 196 09 617 A1 are not used as polyisocyanate crosslinking agents. This known coating material as well requires further improvement in terms of its solids content, and it is also necessary to increase further the crosslinking density of the coatings produced from it.

The German patent application DE 101 18 532.4, unpublished at the priority date of the present specification, describes thermally curable mixtures comprising carbamate-functional binders and amino resin crosslinking agents. The known mixtures may further comprise additional crosslinking agents containing reactive functional groups which are able to react with complementary reactive functional groups other than carbamate groups, in particular with hydroxyl groups. Polyisocyanates, for example, may be used as additional crosslinking agents. Isocyanato-containing adducts such as are known from the German patent application DE 196 09 617 A1 are not used as polyisocyanate crosslinking agents.

The German patent applications DE 100 21 139, DE 100 20 969.6, and DE 100 23 229.9, which were unpublished at the priority date of the present specification, describe multicomponent coating materials, adhesives, and sealing compounds comprising binders and isocyanato-containing adducts such as are known from the German patent application DE 196 09 617 A1. The binders are (meth)acrylate copolymers based on selected hydroxyl-containing (meth)acrylate monomers. The binders may also include in copolymerized form at least one further monomer, which may be selected from 14 monomer classes. Among others, monomers containing carbamate groups may also be used. Furthermore, the coating materials, adhesives, and sealing compounds may also include additional crosslinking agents which may be selected from the group consisting of amino resins, compounds containing epoxide groups, compounds containing carboxyl groups, blocked polyisocyanates, and tris(alkoxycarbonylamino)triazines. Further, nonblocked polyisocyanates as well may be used as reactive crosslinking agents. In the examples, however, only mixtures containing carbamate-free binders, adducts in accordance with the German patent application DE 196 09 617 A1, and non-blocked polyisocyanates are described.

The German patent application DE 100 47 989.9, unpublished at the priority date of the present specification, describes multicomponent coating materials, adhesives, and sealing compounds which are curable thermally and with actinic radiation and which additionally comprise at least one crosslinking agent containing on average per molecule at least one isocyanate group and at least one functional group having at least one bond which can be activated with actinic radiation.

Here and below, actinic radiation means electromagnetic radiation, such as near infrared (NIR), visible light, UV radiation, and X-rays, especially UV radiation, and corpuscular radiation, such as electron beams.

The German patent application DE 101 40 145.0, unpublished at the priority date of the present specification, describes curable compositions which comprise carbamate-functional constituents and a large number of polyisocyanates as crosslinking agents. In this case it is possible, inter alia, to use, as polyisocyanates, the adducts known from the German patent application DE 196 09 617 A1. In special cases, the curable compositions may comprise amino resins. Where they are used, they are present in amounts such that the crosslinking of the carbamate groups takes place primarily by way of the polyisocyanates. The equivalents ratio of complementary reactive functional groups in the amino resins to the carbamate groups present is preferably not more than 0.2.

It is an object of the present invention to provide a novel curable composition which is easy to prepare, has a high solids content, and, as a two-component or multicomponent system, has a comparatively long pot life or processing time. Where necessary, the novel curable composition should also be curable with actinic radiation.

The novel composition is to be highly suited to the production of films and moldings and also very highly suited as a coating material, adhesive, and sealing compound for producing coatings, adhesive films, and seals. In particular, the novel coatings are to have the advantageous properties associated with the known coatings based on carbamate-functional binders, amino resins, and polyisocyanates, such as a particularly high weathering stability and etch resistance. Furthermore, however, they are to have a higher hardness and scratch resistance at the same time as a high acid resistance.

The invention accordingly provides the novel curable composition comprising
(A) at least one constituent containing at least two carbamate groups of the general formula I:

—O—C(O)—NHR    (I)

in which R is a hydrogen atom or a substituted or unsubstituted alkyl, cycloalkyl or aryl group,
(B) at least one constituent containing carbamate-reactive functional groups selected from the group consisting of methylol, methoxyalkyl, N-methylol, and N-methoxyalkyl groups, the equivalents ratio of carbamate-reactive groups in (B) to carbamate groups in (A) being >0.2,
(C) at least one adduct preparable from
  (c1) at least one polyisocyanate and
  (c2) at least one compound of the general formula II containing an isocyanate-reactive functional group:

(II)

in which the variables have the following meanings:
$R^1$ and $R^2$: independently of one another=hydrogen atoms or alkyl groups having from 1 to 10 carbon atoms;
X and Y: independently of one another =oxygen atom, sulfur atom or a group >N—$R^6$, in which $R^6$=aliphatic group having from 1 to 30 carbon atoms, whose carbon chain may be interrupted by one or more oxygen atoms, or aromatic groups having from 6 to 30 carbon atoms;
$R^3$: alkylene group having from 1 to 5 carbon atoms;
$R^4$ and $R^5$: independently of one another=hydrogen atoms, isocyanate-reactive functional groups or groups $R^6$;
with the proviso that one group $R^4$, $R^5$ or $R^6$ contains an isocyanate-reactive functional group or one group $R^4$ or $R^5$ is an isocyanate-reactive functional group and the other radicals $R^4$, $R^5$ or $R^6$—where present—contain no isocyanate-reactive functional groups;

the molar ratio of polyisocyanates (c1) to compounds (c2) being chosen such that the adducts (C) still contain on average per molecule at least one free isocyanate group.

In the text below, the novel curable composition is referred to as the "composition of the invention".

Further subject matter of the invention will emerge from the description.

In the light of the prior art it was surprising and unforeseeable for the skilled worker that the object on which the present invention was based could be achieved by means of the composition of the invention.

A particular surprise was that the composition of the invention could be prepared easily from commercial coating materials by adding the compounds or adducts (C) for use in accordance with the invention and that it had a comparatively long pot life or processing time and a high solids.

In particular, it was surprising that the composition of the invention was outstandingly suitable for producing moldings and films.

It was also surprising that the composition of the invention was also outstandingly suitable as a coating material, adhesive, and sealing compound for producing coatings, adhesive films, and seals, preferably coatings, especially electrocoats, surfacer coats, antistonechip primer coats, solid-color topcoats, basecoats, and clearcoats.

Surprisingly, the novel films, moldings, coatings, adhesive films, and seals were highly suitable for the coating, adhesive bonding, sealing, wrapping, and packaging of motor vehicle bodies and parts thereof, the inside and outside of buildings and parts thereof, doors, windows, furniture, hollow glassware, coils, containers, packaging, small parts, such as nuts and bolts, wheel rims or hub caps, electrical components, such as wound goods (coils, stators, rotors), and components for white goods, such as radiators, domestic appliances, refrigerator casings or washing machine casings.

The first essential constituent of the composition of the invention is at least one constituent (A) containing at least two, preferably at least three and in particular at least four carbamate groups of the general formula I. In the general formula I the variable R is a hydrogen atom or a substituted or unsubstituted alkyl, cycloalkyl or aryl group.

Suitable alkyl groups have from 1 to 20 carbon atoms. Examples of suitable alkyl groups are methyl, ethyl, propyl, isopropyl, n-butyl, secondary-butyl, isobutyl, tertiary-butyl, amyl, n-hexyl, heptyl, octyl, isooctyl, nonyl, decyl, undecyl, dodecyl, tridecyl, tetradecyl, pentadecyl, hexadecyl, heptadecyl, octadecyl, nonadecyl, and eicosanyl groups.

Suitable cycloalkyl groups are monocyclic, bicyclic, and polycyclic cycloalkyl groups having from 5 to 20 carbon atoms. The cycloalkyl groups are preferably selected from the group consisting of substituted and unsubstituted cyclopentyl, cyclohexyl, cycloheptyl, cyclooctyl, bicyclo[2.2.1]heptan-1-yl, bicyclo[2.2.2]-octan-1-yl, decalin-1-yl, hydroindan-1-yl, dicyclopentanyl, tricyclodecan-1-yl, adamantan-1-yl, camphan-4-yl, pinan-4-yl, caran-1-yl, and norbornan-1-yl groups.

Suitable aryl groups are monocyclic, bicyclic, and polycyclic aryl groups having from 6 to 20 carbon atoms. The aryl groups are preferably selected from the group consisting of phenyl, naphthyl, biphenylyl, and phenanthrenyl groups.

Where used, the substituents are selected from the group consisting of halogen atoms, nitrile groups, nitro groups, partially or fully halogenated alkyl, cycloalkyl, alkylcycloalkyl, cycloalkylalkyl, aryl, alkylaryl, cycloalkylaryl, arylalkyl, and arylcycloalkyl groups; aryloxy, alkyloxy, and cycloalkyloxy groups; and also arylthio, alkylthio, and cycloalkylthio groups; the alkyl, cycloalkyl, and aryl groups used being those described above.

Preferably, the alkyl, cycloalkyl, and aryl groups are unsubstituted. With particular preference, R is a hydrogen atom.

The constituent (A) may be of low molecular mass. Examples of suitable low molecular mass constituents (A) are described in detail in the references EP 0 710 707 A2, page 4 lines 1 to 27, or EP 0 915 113 A1, page 2 lines 44 to 48 and page 6 lines 21 to 25, EP 0 636 660 B1, column 1 line 41 to column 2 line 3, column 2 line 12 to column 3 line 32, and column 5 line 43 to column 6 line 36, or WO 87/00851, page 13 line 11 to page 15 line 8, and Example 1 to Example 33, pages 17 to 27.

These low molecular mass constituents (A) permit the preparation of particularly high-solids compositions of the invention.

The constituent (A) may be oligomeric and/or polymeric. Suitable oligomers and polymers (A) come from the polymer classes of the random, alternating and/or block, linear and/or branched, and/or comb, addition (co)polymers of ethylenically unsaturated monomers, or polyaddition resins and/or polycondensation resins. For further details of these terms, refer to Römpp Lexikon Lacke und Druckfarben, Georg Thieme Verlag, Stuttgart, N.Y., 1998, page 457, "polyaddition" and "polyaddition resins (polyadducts)", and also pages 463 and 464, "polycondensates", "polycondensation", and "polycondensation resins".

Examples of highly suitable addition (co)polymers (A) are (meth)acrylate copolymers and partially hydrolyzed polyvinyl esters, especially (meth)acrylate copolymers.

Examples of highly suitable polyaddition resins and/or polycondenstion resins (A) are polyesters, alkyds, polyurethanes, polylactones, polycarbonates, polyethers, epoxy resin-amine adducts, polyureas, polyamides or polyimides, especially polyesters.

With very particular preference, the oligomers and/or polymers (A) come from the polymer classes of the (meth)acrylate copolymers and polyesters.

Carbamate-functional oligomers and polymers (A) which come from the abovementioned polymer classes, and processes for preparing them, are known from the patent applications EP 0 594 068 A1, page 2 line 45 to page 4 line 27, page 5 lines 36 to 57, and page 7 lines 1 to 22, EP 0 594 142 A1, page 3 line 1 to page 4 line 37, page 5 line 49 to page 6 line 12, and page 7 lines 5 to 26, EP 0 675 141 B1, page 2 line 44 to page 5 line 15, and page 8 line 5 to page 10 line 41, WO 94/10211, page 4 line 18 to page 8 line 8, page 12 line 30 to page 14 line 36, page 15 line 35 to page 17 line 32, and page 18 line 16 to page 19 line 30, WO 01/23439, page 3 lines 13 to 29, page 4 line 25 to page 19 line 18, in conjunction with the preparation examples 1 to 3, page 36 line 16 to page 38 line 12, and EP 0 915 113 A1, page 6 line 26 to page 8 line 49, and Example 1, page 11 lines 3 to 15.

The oligomers and/or polymers (A) are preferably prepared by copolymerizing a monomer mixture comprising at least one olefinically unsaturated carboxylic acid, methacrylic acid for example, in the presence of a glycidyl ester of Versatic® acid (cf. Römpp Lexikon Lacke und Druckfarben, Georg Thieme Verlag, Stuttgart N.Y., 1998, "Versatic® acids", pages 605 and 606) and then reacting the resultant hydroxyl-containing (meth)acrylate copolymer with at least one alkyl carbamate, such as methyl, propyl or butyl carbamate. Or else hydroxyl-containing (meth)acrylate copolymers and polyesters are converted using phosgene into (meth)acrylate copolymers containing chloroformate groups, after which the chloroformate groups are converted into carbamate groups using ammonia or primary amines. It is also possible to react isocyanato-containing (meth)acrylate copolymers or polyesters with at least one hydroxyalkyl carbamate, such as 2-hydroxyethyl carbamate.

The oligomers and polymers (A) preferably have a number-average molecular weight of from 600 to 20,000, more preferably from 800 to 15,000, with particular preference from 1000 to 10,000, with very particular preference from 1200 to 8000, and in particular from 1200 to 6000 daltons.

Besides the carbamate groups, it is possible for the low molecular mass constituents, the oligomers and/or polymers (A) to contain at least one, preferably at least two, and in particular at least three reactive functional group(s) other than the carbamate groups. These reactive functional groups are preferably selected from the group consisting of isocyanate-reactive and non-isocyanate-reactive functional groups.

Examples of suitable isocyanate-reactive functional groups are hydroxyl, thiol, and primary and secondary amino groups, particularly hydroxyl groups.

By non-isocyanate-reactive functional groups are meant those groups which react very little if at all with blocked and nonblocked isocyanate groups that are present, under the customary and known conditions of thermal crosslinking. Examples of suitable non-isocyanate-reactive groups are carboxyl groups, epoxide groups, and cyclic carbonate groups, particularly carboxyl groups.

With particular preference, hydroxyl groups are used.

Examples of suitable low molecular mass constituents (A) containing hydroxyl groups are known from European patent application EP 0 915 113 A1, page 6 lines 21 to 25, or the international patent application WO 87/00851, page 13 line 11 to page 15 line 8, and Example 1 to Example 33, pages 17 to 27.

Examples of suitable oligomeric and polymeric constituents (A) which contain hydroxyl groups are known from the European patent application EP 0 915 113 A1, Example 1, page 11 lines 3 to 15, and from the European patent EP 0 675 141 B1, page 2 line 44 to page 5 line 15 and page 8 line 5 to page 10 line 41.

Where the constituents (A) contain reactive functional groups other than the carbamate groups, they are preferably present in minor amounts, so that the compositions of the invention are crosslinked primarily by way of the carbamate groups. By a minor amount is meant an amount of the non-carbamate reactive functional groups in the constituents (A) of <50, preferably <45, more preferably <40, with particular preference <35, with very particular preference <30, and in particular <25 equivalent %, based in each case on the total amount of the reactive functional groups in a constituent (A).

The amount of the above-described compounds (A) in the compositions of the invention may vary widely and is guided by the requirements of the case in hand, in particular by the functionality of the complementary reactive groups in the compounds (A) on the one hand and in the crosslinking agents (B) and the adducts (C) on the other. The amount is preferably from 20 to 80%, more preferably from 22 to 75%, with particular preference from 25 to 70%, with very particular preference from 25 to 65%, and in particular form 25 to 60% by weight, based in each case on the solids of the composition of the invention.

The further essential constituent of the composition of the invention is at least one constituent (B) containing carbamate-reactive functional groups selected from the group consisting of methylol, methoxyalkyl, N-methylol, and N-methyoxyalkyl groups. The constituents (B) are preferably amino resins, especially melamine resins. Examples of suitable amino resins are described in Römpp Lexikon Lacke und Druckfarben, Georg Thieme Verlag, 1998, page 29, "amino resins", in the text book "Lackadditive" [Additives for coatings] by Johan Bieleman, Wiley-VCH, Weinheim, N.Y., 1998, pages 242 ff., in the book "Paints, coatings and solvents", second, completely revised edition, edited by D. Stoye and W. Freitag, Wiley-VCH, Weinheim, N.Y., 1998, pages 80 ff., in the patents U.S. Pat. No. 4,710,542 A1 or EP 0 245 700 A1, and in the article by B. Singh and coworkers, "Carbamylmethylated melamines, novel crosslinkers for the coatings industry" in Advanced Organic Coatings Science and Technology Series, 1991, Volume 13, pages 193 to 207.

In the compositions of the invention, the constituents (B) are present in an amount such as to give an equivalents ratio of carbamate-reactive groups in (B) to carbamate groups in (A) of >0.2.

The further essential constituent of the composition of the invention is at least one adduct (C) preparable from
(c1) at least one polyisocyanate, in particular a diisocyanate, and
(c2) at least one compound of the general formula II containing an isocyanate-reactive functional group:

(II)

in which the variables have the following meanings:
R$^1$ and R$^2$: independently of one another=hydrogen atoms or alkyl groups having from 1 to 10 carbon atoms;
X and Y: independently of one another=oxygen atom, sulfur atom or a group >N—R$^6$, in which R$^6$=aliphatic group having from 1 to 30 carbon atoms, whose carbon chain may be interrupted by one or more oxygen atoms, or aromatic groups having from 6 to 30 carbon atoms;
R$^3$: alkylene group having from 1 to 5 carbon atoms;
R$^4$ and R$^5$: independently of one another=hydrogen atoms, isocyanate-reactive functional groups or groups R$^6$;
with the proviso that one group R$^4$, R$^5$ or R$^6$ contains an isocyanate-reactive functional group or one group R$^4$ or R$^5$ is an isocyanate-reactive functional group and the other radicals R$^4$, R$^5$ or R$^6$—where present—contain no isocyanate-reactive functional groups;

the molar ratio of polyisocyanates, especially diisocyanates, (c1) to compounds (c2) being chosen such that the adducts (C) still contain on average per molecule at least one free isocyanate group.

Examples of suitable polyisocyanates and diisocyanates are known from the German patent applications DE 199 24 170 A1, column 2 lines 6 to 34 in conjunction with column 3 line 61 to column 6 line 68, and column 10 line 57 to column 11 line 38, DE 199 47 523 A1, page 7 line 56, page 8, page 13, or DE 199 30 067 A1, page 9 line 53 to page 10 line 6.

The compounds (c2) contain an isocyanate-reactive functional group. Examples of suitable isocyanate-reactive functional groups are hydroxyl groups, thiol groups, and primary or secondary amino groups.

In the general formula II, $R^1$ and $R^2$ independently of one another are hydrogen atoms or alkyl groups having from 1 to 10 carbon atoms, preferably methyl, ethyl, propyl, isopropyl, n-butyl, sec-butyl, tert-butyl, n-pentyl, isoamyl, n-hexyl, n-heptyl, n-octyl, 2-ethylhex-1-yl, n-nonyl or n-decyl groups, particularly isopropyl groups;

X and Y independently of one another are oxygen atoms, sulfur atoms or groups >N—$R^6$, in which $R^6$ is an aliphatic group having from 1 to 30 carbon atoms, whose carbon chain may be interrupted by one or more oxygen atoms, such as the above-described groups $R^1$ and $R^2$, undecyl, dodecyl, tridecyl, tetradecyl, pentadecyl, hexadecyl, heptadecyl, octadecyl, nonadecyl or eicosanyl or oligo(ethylene glycol)-1-yl, oligo(propylene glycol)-1-yl or oligo(butylene glycol)-1-yl groups, or the corresponding mixed oligomers with a degree of oligomerization of up to 15. Additionally, $R^6$ may be an aromatic group having from 6 to 30 carbon atoms such as phenyl, naphthyl, biphenyl-1-yl or phenanthrenyl groups.

$R^3$ is an alkylene group having from 1 to 5 carbon atoms such as methylene, eth-1,2-ylene, trimethylene, tetramethylene or pentamethylene groups. $R^4$ and $R^5$ independently of one another are hydrogen atoms, isocyanate-reactive functional groups or groups $R^6$.

For the compounds (c2) it is essential that one group $R^4$, $R^5$ or $R^6$ contains an isocyanate-reactive functional group or one group $R^4$ or $R^5$ is an isocyanate-reactive functional group, and the other groups $R^4$, $R^5$ or $R^6$—where present—contain no isocyanate-reactive functional groups.

Examples of highly suitable compounds (c2) are dioxolanes of the general formula III:

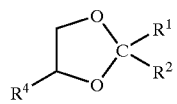

(III)

dioxanes of the general formula IV:

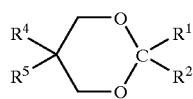

(IV)

oxazolidines of the general formula V:

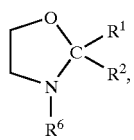

(V)

in which the groups $R^1$, $R^2$, $R^4$, $R^5$ and $R^6$ are as defined above, the groups $R^4$ or $R^6$ containing an isocyanate-reactive functional group.

Examples of suitable dioxolanes (II), dioxanes (III), and dioxazolidines (IV), and their preparation, are described in detail in the examples of the German patent application DE 196 09 617 A1, page 5 line 54 to page 9 line 27.

Of these, the oxazolidines (IV) have particular advantages and so are used with particular preference in accordance with the invention. Examples of especially suitable oxazolidines (IV) are N-(2-hydroxyethyl)-1,3-oxazolidine or N-(2-hyeroxyethyl)-2-isopropyl-1,3-oxazolidine, as described on page 6, Table 1, No. 5a and No. 5b of the German patent application DE 196 09 617 A1.

For the preparation of the adduct (C), the molar ratio of polyisocyanates, especially diisocyanates, (c1) to compounds (c2) is chosen so that the adducts (C) still contain on average per molecule at least one free isocyanate group. The method of preparing the adducts (C) has no special features but is instead carried out as described in the German patent application DE 196 09 617 A1.

The amount of the above-described adducts (C) in the compositions of the invention may vary very widely. It is guided in particular by the functionality of the constituents (A) and (B) and by the target viscosity of the compositions of the invention. The amount is preferably from 20 to 90%, more preferably from 22 to 85%, with particular preference from 23 to 80%, with very particular preference from 24 to 75%, and in particular from 25 to 70% by weight, based in each case on the solids of the composition of the invention.

The composition of the invention may further comprise at least one customary and known additive (D) selected from the group consisting of binders which cure physically, thermally, with actinic radiation, and thermally and with actinic radiation, and which are different than above-described binders (A); additional crosslinking agents; reactive diluents which are curable thermally, with actinic radiation, and thermally and with actinic radiation; photoinitiators; molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile free-radical initiators; adhesion promoters; leveling agents; film formation auxiliaries; rheological aids, such as thickeners and pseudoplastic sag control agents, SCAs; flame retardants; corrosion inhibitors; free-flow aids; waxes; siccatives; biocides; and flatting agents.

Examples of suitable additives are described in detail in the textbook "Lackadditive" by Johan Bieleman, Weinheim VCH, Weinheim, N.Y., 1998, in D. Stoye and W. Freitag (editors) "Paints, coatings and solvents", second, completely revised edition, Wiley-VCH, Weinheim, N.Y., 1998, "14.9. solvent groups", pages 327 to 373 in the German patent application DE 199 14 896 A1, column 14 line 26 to column 15 line 46, or in the German patent application DE 199 08 018 A1, page 9 line 31 to page 8 line 30. For further details, refer to the German patent applications DE 199 04 317 A1, DE 198 18 735 A1, and DE 198 55 125 A1 or to the German patent DE 197 09 476 C1.

The compositions of the invention comprising the constituents described above are used in particular as clearcoat materials for producing clearcoats or as starting products for producing clear, transparent films and moldings.

Alternatively, the compositions of the invention may be pigmented. In that case they preferably comprise at least one pigment (E) selected from the group consisting of organic and inorganic, transparent and opaque, color and/or effect, electrically conductive, magnetically shielding, and fluorescent pigments, fillers, and nanoparticles.

The pigmented compositions of the invention are used in particular as electrocoat materials, surfacers, basecoat materials, and solid-color topcoat materials for producing electrocoats, surfacer coats or antistonechip primer coats, basecoats and solid-color topcoats, or for producing pigmented films and moldings.

Where exclusively non-opaque, transparent pigments are used, particularly nanoparticles, the pigmented compositions of the invention may also be used as clearcoat materials or for producing clear, transparent films and moldings.

In terms of its method, the preparation of the composition of the invention has no special features but instead takes place by the mixing and homogenizing of the above-described constituents with the aid of customary and known mixing techniques and apparatus such as stirred tanks, stirred mills, extruders, compounders, Ultraturrax, inline dissolvers, static mixers, micromixers, toothed-ring dispersers, pressure relief nozzles and/or microfluidizers, in the absence where appropriate of actinic radiation. It is an advantage to prepare a stock varnish from the constituents (A) and (B) and also, where appropriate, the constituents (D) and/or (E), to which the adduct (C) is then added prior to the application of the composition of the invention.

The resulting compositions of the invention are conventional compositions, containing organic solvents, aqueous compositions, substantially or completely solvent-free and water-free liquid compositions (100% systems), substantially or completely solvent-free and water-free solid powders, or substantially or completely solvent-free powder suspensions (powder slurries).

The compositions of the invention are applied to customary and known, temporary or permanent substrates. For the production of films and moldings of the invention it is preferred to use customary and known temporary substrates, such as metal and polymer belts or hollow bodies made of metal, glass, plastic, wood or ceramic which can be removed easily without damaging the films and moldings of the invention. Where the compositions of the invention are used to produce coatings, adhesives, films and seals, permosubstrates are used, such as motor vehicle bodies and parts thereof, the inside and outside of buildings and parts thereof, doors, is windows, furniture, hollow glassware, coils, containers, packaging, small parts, electrical components, and components for white goods. The films and moldings of the invention may likewise serve as substrates. Further examples of suitable substrates are known from the German patent applications DE 199 24 172 A1, page 8 lines 21 to 37, or DE 199 30 067 A1, page 13 line 61 to page 14 line 16.

In terms of its method, the application of the compositions of the invention has no special features but may instead take place by any customary and known application method suitable for the composition in question, examples being electrodeposition, spraying, squirting, knifecoating, brushing, flowcoating, dipping, trickling or rolling. Preference is given to using spray application methods, except where the composition is a powder.

The application of the powders also has no special features as far as its method is concerned but instead takes place, for example, by the customary and known fluidized bed techniques, such as are known, for example, from the BASF Coatings AG brochures "Pulverlacke für industrielle Anwendungen" [Powder coating materials for industrial applications], January 2000, or "Coatings Partner, Pulverlack Spezial" [Coatings partner, powder coatings special], ½000, or Römpp Lexikon Lacke und Druckfarben, Georg Thieme Verlag, Stuttgart, N.Y., 1998, pages 187 and 188, "electrostatic powder spraying", "electrostatic spraying", and "electrostatic fluidized bath process".

The compositions of the invention are used preferably to produce moldings and films or as coating materials, adhesives, and sealing compounds for producing coatings, adhesive films, and seals. In particular the coating materials are used to produce multicoat color and/or effect paint systems by the customary and known wet-on-wet techniques (cf., for example, the German patent applications DE 199 14 896 A1, column 16 line 54 to column 18 line 57, or DE 199 30 067 A1, page 15 line 25 to page 16 line 36).

The curing of the applied compositions of the invention also has no special features in terms of its method and instead takes place with the aid of the customary and known thermal methods, such as heating in a forced air oven or irradiation with IR lamps, and also, where appropriate, with the aid of the customary and known methods of radiation curing, as are described, for example, in the German patent application DE 198 18 735 A1, column 10 line 31 to column 11 line 33.

The resultant coatings and films of the invention, especially the single-coat or multicoat color and/or effect paint systems and clearcoats of the invention, particularly the clearcoats, are easy to produce and have outstanding optical properties and very high light stability, chemical resistance, water resistance, condensation resistance, weathering stability, and etch resistance. In particular, they are free from turbidities and inhomogeneities. They exhibit outstanding scratch resistance and abrasion resistance combined with an outstanding surface hardness and acid resistance.

The adhesive films of the invention permanently and firmly join a very wide variety of substrates to one another and possess high chemical and mechanical stability even in the case of extreme temperatures and/or temperature fluctuations.

Similarly, the seals of the invention seal the substrates permanently, and exhibit high mechanical and chemical stability even in the case of extreme temperatures and/or temperature fluctuations, and even in conjunction with exposure to aggressive chemicals.

Accordingly, the primed or unprimed substrates commonly employed in the technological fields recited above and coated with at least one coating of the invention, bonded with at least one adhesive film of the invention, sealed with at least one seal of the invention and/or wrapped or packaged with at least one film of the invention or at least one molding of the invention combine a particularly advantageous profile of performance properties with a particularly long service life, so making them particularly attractive both economically and environmentally.

EXAMPLES

Preparation Example 1

The Preparation of a Methacrylate Copolymer (A) Containing Carbamate Groups

A reactor equipped with a stirrer, oil heating, two dropping funnels, a nitrogen inlet pipe, a thermometer, and a reflux condenser was charged with 326.1 parts by weight of methyl carbamate, 489.8 parts by weight of xylene and 482.6 parts by weight of Cardura® E 10 (glycidyl ester of Versatic® acid from Shell) and this initial charge is heated to 140° C. with stirring. After it has reached this temperature, a monomer mixture of 434.6 parts by weight of hydroxymethyl methacrylate, 119 parts by weight of styrene and 163.6 parts by weight of methacrylic acid was metered into the initial charge at a uniform rate over the course of three hours and an initiator solution of 72 parts by weight of Vazo® 67 (2,2'-azobis(2-methylbutanenitrile) from Du Pont) and 181.9 parts by weight of xylene was metered into the initial charge at a uniform rate over the course of three hours. The two feeds were commenced simultaneously. After the end of the feeds, the reaction mixture was cooled to 115° C. over the course of 30 minutes. Then an initiator solution of 12.1 parts by weight of 2,2'-azobis(2-methylbutanenitrile) and 36.9 parts by weight of xylene was metered into the reaction mixture over the course of one hour, after which the reaction mixture was held at 115° C. for a further hour. Following the addition of 2.8 parts by weight of Fascat® 4100 (monobutyltin oxide from Atochem) in 31.3 parts by weight of cyclohexane, the reaction mixture was heated to 140° C. with stirring and held at this temperature until the hydroxyl number was 77 mg KOH/g solids. The reaction mixture was subsequently cooled to 100° C. and diluted with 25 parts by weight of methyl isobutyl ketone and 125 parts by weight of xylene. Unreacted methyl carbamate and the cyclohexane were distilled off under reduced pressure at 130° C. until the methyl carbamate content was <2% by weight. After cooling to 80° C., the reaction mixture was diluted with 125 parts by weight of methoxypropanol. The resulting solution of the carbamate-functional methacrylate copolymer (A) had a solids content of 70% by weight (60 minutes forced air oven/130° C.), an acid number of from 1 to 4 mg KOH/g solids, and a color number of from 4 to 5 (Gardner).

Preparation Example 2

The Preparation of the Solution of a Thixotropic Agent (D)

In a reactor, 814 parts by weight of the methacrylate copolymer solution (A) from Preparation Example 1 were mixed with 96 parts by weight of Solventnaphtha® and 19.6 parts by weight of benzylamine. With vigorous stirring, a mixture of 15.4 parts by weight of hexamethylene diisocyanate and 35 parts by weight of Solventnaphtha® was added. The resulting reaction mixture was stirred for 15 minutes more. The solution of the thixotropic agent (D) had a solids content of 60% by weight (60 minutes forced air oven/130° C.).

Preparation Example 3

The Preparation of a Thixotroping Paste (D)

In a stirred laboratory mill from Vollrath, 800 g of millbase consisting of 592 parts by weight of the methacrylate copolymer solution (A) from Preparation Example 1, 80 parts by weight of butyl acetate, 64 parts by weight of xylene and 64 parts by weight of Aerosil® 972 (average primary particle size: 16 nm; internal surface area by BET in accordance with DIN 66131: 110±20 m$^2$/g; Degussa A G, Hanau, Germany) were weighed out together with 1100 parts by weight of quartz sand (grain size 0.7–1 mm) and this millbase was dispersed for 30 minutes with water cooling. The quartz sand was then separated off.

Preparation Example 4

The Preparation of a Blocked Polyisocyanate (Additional Crosslinking Agent (D))

In a suitable stainless steel reactor, 40 parts by weight of Basonat® HI 190 B/S (hexamethylene diisocyanate-based isocyanate from BASF Aktiengesellschaft) and 16.4 parts by weight of Solventnaphtha® were weighed out and heated to 50° C. Over the course of four hours, 26.27 parts by weight of diethyl malonate, 6.5 parts by weight of ethyl acetoacetate and 0.3 part by weight of catalyst solution (sodium methylhexanoate) were metered in at a uniform rate. Thereafter the temperature was raised to 70° C. When an isocyanate equivalent weight of from 5900 to 6800 had been reached, 1.03 parts by weight of 1,4-cyclohexanedimethanol were added at 70° C. over the course of 30 minutes with stirring. When an isocyanate equivalent weight of ≧13,000 had been reached, 5 parts by weight of n-butanol were added. The temperature of the reaction mixture was lowered to 50° C. and the resulting blocked polyisocyanate was diluted with n-butanol to a theoretical solids content of 68% by weight.

Examples 1 and 2

The Preparation of the Inventive Clearcoat Materials 1 and 2

To prepare the inventive clearcoat materials 1 and 2, first of all a stock varnish was prepared by mixing and homogenizing the following constituents:
  206 parts by weight of the methacrylate copolymer solution (A) from Preparation Example 1,
  207 parts by weight of the solution of thixotropic agent (D) from Preparation Example 2,
  41 parts by weight of the thixotroping paste (D) from Preparation Example 3,
  55 parts by weight of the blocked polyisocyanate (D) from Preparation Example 4,
  5 parts by weight of Disperbyk® 161 (30 percent solution of a commercial wetting agent from Byk Chemie),
  128 parts by weight of Resimene® BM-9539 (constituent (B); commercial, methyl- and butyl-etherified melamine resin from Monsanto),
  10 parts by weight of Tinuvin® 384 (commercial UV absorber from Ciba Specialty Chemicals, Inc.),
  8 parts by weight of Tinuvin® 123 (commercial reversible free-radical scavenger, sterically hindered amine (HALS) from Ciba Specialty Chemicals, Inc.),
  20 parts by weight of Nacure® 5528 (commercial catalyst (amine-blocked sulfonic acid derivative) from King),
  2 parts by weight of Silwet® L-7604 (commercial additive from Witco Surfactants),
  31 parts by weight of butyl diglycol acetate,
  37 parts by weight of xylene,
  47 parts by weight of Solvesso® 200,
  153 parts by weight of Solventnaphtha, and
  31 parts by weight of butyl glycolate.

The stock varnish was adjusted using Solventnaphta® II to a spray viscosity of 26 seconds in a DIN 4 flow cup. The varnish then had a solids content of 43.3% by weight (1 hour/125° C.).

Example 1

To prepare the inventive clearcoat material 1, 100 parts by weight of the stock varnish were admixed with 30 parts by weight of Basonat® SCI 3000 mPas from BASF Aktiengesellschaft (adduct (C) of 1 mol of the allophanate of hexamethylene diisocyanate and 1 mol of N-(2-hydroxyethyl)-2-isopropyloxazolidine) and adjusted using Solventnaphta® II to a spray viscosity of 26 seconds in a DIN 4 flow cup. The inventive clearcoat material 1 then had a solids content of 53.7% by weight (1 hour/125° C.).

Example 2

To prepare the inventive clearcoat material 2, Example 1 was repeated but using 50 parts by weight rather than 30 parts by weight of Basonat® SCI 3000 mPas. The inventive clearcoat material 2 had a solids content of 57.3% by weight (1 hour/125° C.).

The inventive clearcoat materials were outstandingly suitable for the production of clearcoats and of multicoat color and/or effect paint systems by the wet-on-wet technique. They could be used to produce both original finishes and refinishes.

Examples 3 and 4

The Production of the Inventive Color Multicoat Paint Systems 1 and 2

To produce the multicoat paint systems 1 and 2, steel test panels which have been coated with an electrocoat in a dry film thickness of from 18 to 22 μm were coated with a waterborne surfacer. The resulting waterborne surfacer film was baked at 160° C. for 20 minutes so as to give a surfacer coat with a dry film thickness of from 35 to 40 μm. The surfacer coat was subsequently coated with a black aqueous basecoat material from BASF Coatings AG in a film thickness from 12 to 15 μm. The resulting aqueous basecoat films were flashed off at 80° C. for 10 minutes. Thereafter, the clearcoat material 1 from Example 3 and the clearcoat material 2 from Example 4 were each applied pneumatically using a gravity-feed cup gun in one cross pass in a film thickness of from 40 to 45 μm. The clearcoat films were subsequently flashed off at room temperature for 10 minutes and at 80° C. for 10 minutes and together with the aqueous basecoat films were baked in a forced air oven at 140° C. for 20 minutes. This gave the inventive multicoat color paint systems 1 and 2.

These systems were of "automotive quality" (cf. also the European patent EP 0 352 298 B1 in this respect, page 15 line 42 to page 17 line 40) as regards gloss, distinctness of image, uniformity of hiding power, uniformity of film thickness, resistance to fuel, solvents, and acids, hardness, abrasion resistance, scratch resistance, impact strength, adhesion, weathering stability, and resistance to water and moisture. They were therefore also suitable for use in the finishing of top-class automobiles.

What is claimed is:

1. A curable composition comprising
   (A) at least one constituent containing at least two carbamate groups of the general formula I:

—O—C(O)—NHR  (I)

in which R is a hydrogen atom or a substituted or unsubstituted alkyl group, a substituted or unsubstituted cycloalkyl group, or a substituted or unsubstituted aryl group,
   (B) at least one constituent containing carbamate-reactive functional groups selected from the group consisting of methylol, methoxyalkyl, N-methylol, N-methoxyalkyl groups, and combinations thereof, an equivalents ratio of carbamate-reactive groups in (B) to carbamate groups in (A) being >0.2,
   (C) at least one adduct comprising a reaction product of
      (c1) at least one polyisocyanate and
      (c2) at least one compound of the general formula II containing an isocyanate-reactive functional group:

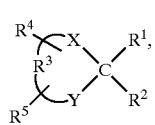
(II)

wherein
   $R^1$ and $R^2$: independently of one another=hydrogen atoms or alkyl groups having from 1 to 10 carbon atoms;
   X and Y: independently of one another=oxygen atom, sulfur atom or a group >N—$R^6$, in which $R^6$=aliphatic group having from 1 to 30 carbon atoms, whose carbon chain may be interrupted by one or more oxygen atoms, or aromatic groups having from 6 to 30 carbon atoms;
   $R^3$: alkylene group having from 1 to 5 carbon atoms;
   $R^4$ and $R^5$: independently of one another=hydrogen atoms, isocyanate-reactive functional groups or groups $R^6$;
   with the proviso that one group $R^4$, $R^5$, or $R^6$ contains an isocyanate-reactive functional group or one group $R^4$ or $R^5$ is an isocyanate-reactive functional group and the other radicals $R^4$, $R^5$, or $R^6$—where present—contain no isocyanate-reactive functional groups; the molar ratio of polyisocyanates (c1) to compounds (c2) being chosen such that the adducts (C) still contain on average per molecule at least one free isocyanate group.

2. The curable composition of claim 1, wherein the compounds of the general formula II comprise at least one of dioxolanes of the general formula III:

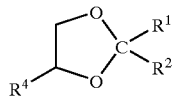
(III)

dioxanes of the general formula IV:

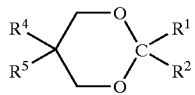
(IV)

or
oxazolidines of the general formula V:

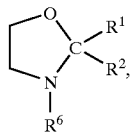
(V)

in which the groups $R^1$, $R^2$, $R^4$, $R^5$ and $R^6$ are as defined above, the groups $R^4$ or $R^6$ contain an isocyanate-reactive functional group.

3. The curable composition of claim 1, wherein the isocyanate-reactive functional groups are selected from the group consisting of hydroxyl, thiol, primary amino groups, secondary amino groups, and combinations thereof.

4. The curable composition of claim 1, wherein the constituents (A) are (meth)acrylate copolymers.

5. The curable composition of claim 1, wherein the constituents (B) are amino resins.

6. The curable composition of claim 1, further comprising at least one of at least one additive (D) and/or at least one pigment (E).

7. The curable composition of claim 6, wherein the additive (D) is selected from the group consisting of a binder that cures by one of physically, thermally, with actinic radiation, or thermally and with actinic radiation, and which is different than the constituents (A); an additional crosslinking agent; a reactive diluent that is curable by one of thermally, with actinic radiation, or thermally and with actinic radiation; a photoinitiator; a molecularly dispersely soluble dye; a light stabilizer; a UV absorber; a reversible free-radical scavenger; an antioxidant; an organic solvent; a devolatilizer; a wetting agent; an emulsifier; a slip additive; a polymerization inhibitor; a thermal crosslinking catalyst; a thermolabile free-radical initiator; an adhesion promoter; a leveling agent; a film formation auxiliary; a rheological aid; a thickener; a pseudoplastic sag control agent; a flame retardant; a corrosion inhibitors; a free-flow aid; a wax; a siccative; a biocide; a flatting agent, and combinations thereof.

8. The curable composition of claim 6, wherein the pigment (E) is selected from the group consisting of organic pigments, inorganic pigments, transparent pigments, opaque pigments, color and/or effect pigments, electrically conductive pigments, magnetically shielding pigments, fluorescent pigments, fillers, nanoparticles and combinations thereof.

9. The curable composition of claim 1, wherein the curable composition is one of an aqueous composition, a solvent-free and water-free composition, a solvent-free and water-free solid powder, or a solvent-free powder suspension (powder slurry).

10. A process for preparing the curable composition of claim 1 comprising
 (1) preparing a stock varnish from the constituents (A) and (B) and, optionally, at least one of at least one additive (D) and/or at least one pigment (E), and
 (2) mixing the adduct (C) with the stock varnish.

11. A method comprising applying the curable composition of claim 1 to a substrate and forming one of a coating, an adhesive film, or a seal.

12. The method of claim 11, wherein the curable composition for each coating is a coating material selected from the group consisting of electrocoat materials, surfacers, antistonechip primers, solid-color topcoat materials, basecoat materials, and clearcoat materials.

13. The method of claim 12, wherein the coating is a multicoat color and/or effect paint system, and the forming is a wet-on-wet technique.

14. The method of claim 11, wherein the substrate is one of a motor vehicle body, a motor vehicle part, a building, a door, a window, furniture, hollow glassware, a coil, a container, a packaging, a part, an electrical component, or a white good.

* * * * *